United States Patent
Penterman et al.

(10) Patent No.: US 6,818,152 B2
(45) Date of Patent: Nov. 16, 2004

(54) STRATIFIED PHASE-SEPARATED COMPOSITE COMPRISING A PHOTO-POLYMERIZATION DYE

(75) Inventors: Roel Penterman, Eindhoven (NL); Dirk Jan Broer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 72 days.

(21) Appl. No.: 10/203,576
(22) PCT Filed: Dec. 12, 2001
(86) PCT No.: PCT/IB01/02511
§ 371 (c)(1), (2), (4) Date: Aug. 9, 2002
(87) PCT Pub. No.: WO02/48281
PCT Pub. Date: Jun. 20, 2002

(65) Prior Publication Data
US 2003/0032713 A1 Feb. 13, 2003

(30) Foreign Application Priority Data

| Dec. 14, 2000 | (EP) | 00204529 |
| Apr. 17, 2001 | (EP) | 01201395 |
| Oct. 25, 2001 | (EP) | 01204081 |

(51) Int. Cl.$^7$ .......................... G02F 1/333; G09K 19/52
(52) U.S. Cl. ...................... 252/299.01; 522/6
(58) Field of Search .......................... 252/299.01; 349/1, 349/19, 56; 522/1, 2, 4, 6, 104, 105, 106, 107, 108, 109, 112

(56) References Cited

U.S. PATENT DOCUMENTS

5,949,508 A    9/1999   Kumar et al.

FOREIGN PATENT DOCUMENTS

| EP | 1 065 553 | * | 1/2001 | ......... G02F/1/1333 |
| WO | 99/47967 | * | 9/1999 | ......... G02F/1/1333 |

OTHER PUBLICATIONS

Vorflusev et al: "Phase–Separated Composite Films for Liquid Crystal Displays," Science vol. 283, Mar. 19, 1999, pp. 1903–1905.

* cited by examiner

Primary Examiner—Shean C. Wu
Assistant Examiner—Jennifer R. Sadula

(57) ABSTRACT

A stratified-phase-separated composite comprising a polymeric layer and a liquid layer is obtained by photo-polymerizing a composition comprising a liquid and a photo-polymerizable monomer. In order to obtain well-stratified composites which may contain liquid which does not absorb radiation used to photo-polymerize, the composition and composite comprises a dye which is adapted to absorb radiation used to carry out the photo-polymerization and which selectively accumulates in the polymeric layer.

20 Claims, 3 Drawing Sheets

STRATIFIED PHASE-SEPARATED COMPOSITE COMPRISING A PHOTO-POLYMERIZATION DYE

The invention relates to a stratified phase-separated composite, a method of manufacturing such a composite and photo-chemically reactive compositions for use in such a method.

In Science vol.283 (1999) page 1903, Kumar et al (see also U.S. Pat. No. 5,949, 508) disclose a phase-separated composite and a method of manufacturing such. The known composite is manufactured by providing, between a pair of opposed substrates, a layer of a photo-polymerizable monomer (prepolymer) dissolved in an organic liquid, in particular a liquid crystal. The organic liquid and monomer are selected such that the liquid is poorly miscible with the photo-polymerized monomer. If so selected, phase-separation of the liquid and the photo-polymer takes place during photo-polymerization, a process known in the art as polymerization-induced phase separation (PIPS). In the composite of Kumar et al. the organic liquid is furthermore adapted to absorb the UV light used for photo-polymerizing the monomer. Therefore, according to Kumar et al, upon subjecting the layer to UV light, a light intensity gradient is set up in the layer in directions normal to the layer, the highest intensity occurring at the side layer facing the UV light source. Since the rate at which photo-polymerization takes place scales with the intensity of UV light, photo-polymerization and therefore phase-separation preferentially takes place at the side of the layer facing the light source. As a result the phase-separation takes place in a stratified manner, producing composite comprising a predominantly polymeric layer formed at the UV light source side and a predominantly liquid layer at the side facing away from the UV light source.

The range of liquid crystals which can be suitably used to form a stratified-phase-separated composite is limited to those which absorb the radiation used to bring about phase-separation. However, for many applications, the use of other liquid crystals would be desirable. In particular, liquid crystal used by Kumar, E7, a cyanobiphenyl LC is not suitable for use in AMLCD. A further disadvantage of the known composite may be that the phase-separation is not perfect. In particular, small amounts of LC material are still present in the polymeric layer. For many applications such inclusions of LC material may be undesirable. For example, the liquid crystal inclusions may give rise to spurious switching effects and if LC inclusions during the useful lifetime migrate to and merge with the liquid layer the properties, such as retardation or orientation, may be affected.

It is an object of the invention, inter alia, to provide a stratified phase-separated composite which does not have these drawbacks. In particular, it is an object to extend the range of stratified-phase-separated composites by extending the range of fluids suitable for use in a such a composite. A further object may be to provide a composite which may have an improved phase-separation.

In accordance with the invention, these objectives are achieved by a stratified phase-separated composite a stratified phase-separated composite comprising a photo-polymeric layer and a liquid layer, the composite being obtainable by photo-polymerizing a layer of a photo-polymerizable stratified-phase-separable composition, the composition comprising:

a photo-polymerizable monomer;
a photo-polymerization dye which, during photo-polymerization, selectively accumulates in the photo-polymeric layer being formed; and
a liquid.

The stratified-phase-separated composite in accordance with the invention is, like the known composite, obtainable by photo-polymerization induced phase-separation. It differs from the known composite in that the stratified-phase-separated composite in accordance with the invention comprises a photo-polymerization dye which is selectively accumulated in the polymeric layer, where in the context of the invention, the term "photo-polymerization dye" refers to a compound which is adapted to at least partially absorb the actinic radiation used for photo-polymerizing the monomeric material.

Since the required intensity gradient is provided by the photo-reactive photo-polymerization dye, the liquid (crystal) may but need not be light-absorbing. The range of liquids which can be suitably used in the composite in accordance with the invention is thus significantly increased. Also, having the photo-polymerization dye as a separate component gives more flexibility in selecting the desired light intensity gradient. After all, in case the absorption is predominantly determined by the liquid crystal, as is the case in the prior art composite, selecting the desired thickness of the liquid layer in the composite already fixes the light intensity gradient and thus the stratification process.

The addition of a dye which selectively accumulates in the polymeric layer may improve the phase-separation. In particular, the improved phase separation may take the form of a reduction of the amount of liquid enclosed in the polymeric layer and/or an improvement in the uniformity of the interface between the liquid and polymeric layer. Although not wishing to be bound by any theory it is noted that adding a photo-polymerization dye (as a component separate from the liquid) changes the absorption of the stratified-phase-separable layer and thus the intensity gradient set up in that layer both at the beginning and during photo-polymerization compared to the known composite in which the liquid serves as the absorbing material. In particular, adding such a dye renders the layer significantly more absorptive and/or the transition from high to low intensity significantly more steep. Moreover, since the dye selectively accumulates in the polymeric layer being formed an intensity gradient is obtained which is different from the gradient obtained using a dye which is either uniformly distributed in the phase-separable layer or a dye which selectively accumulates in the liquid layer such as the light absorbing liquid crystal used by Kumar.

Furthermore, if the composite is used in a device in which the liquid layer is an active layer, such as an LC device, it may be of disadvantage that the photo-polymerization dye is present in such an active layer. After all, generally, the dye serves a purpose during manufacture of the composite but after that, so during use or further manufacture, it has served this purpose and there is—for this purpose—no longer a need for it to be present. Instead during use or further manufacture the dye may in fact have an adverse effect. For example, if a UV photo-polymerization dye is used the liquid may photo-degrade more easily over time. The dye may also influence the electro-optical properties of the liquid such as in particular its dielectric constant and birefringence. By selectively accumulating the dye in the polymeric layer, these adverse effects are avoided. In addition, the amount of dye can be selected freely without having to consider its effect on the liquid layer.

In a broad sense, the invention relates to any stratified-phase-separated composite which comprises a photo-polymerization dye as a component separate from the liquid as long as the dye, at least partially, absorbs the radiation used to photo-polymerize the monomers. However, in general the dyes have a tendency to selectively accumulate in the liquid layer instead of in the polymeric layer.

Generally, dyes which selectively accumulate in the polymeric layer may be found by selecting a dye which dissolves better in the (partially polymerized) monomer than in the liquid. A difference in solubility can be obtained by combining a liquid with a monomer or (partially) polymerized forms thereof having a polarity substantially different from the liquid. For example if the liquid is an apolar liquid the polymer may be polar or rendered polar by functionalizing with polar substituents or even ionic groups. If the dye is selected to be polar or similarly rendered polar selective accumulation in the polymeric layer is obtained.

A further means to promote selective accumulation in the polymeric layer, comprises providing means to chemically bond the dye to (partially polymerized) monomers. Accordingly, in a preferred embodiment of the stratified-phase-separated composite in accordance with the invention, the photo-polymerization dye is a photo-chemically reactive dye which, during photo-polymerization, is capable of photo-chemically bonding to photo-polymerizable or photo-polymerized monomers.

In photo-chemically bonding the dye to the monomers or polymerized monomers, the (polymerized) monomers force the dye into the polymeric layer being formed thus obtaining selective accumulation in the polymeric layer. By using such a photo-chemically reactive dye, any photo-polymerization dye, in particular any conventional dye, may be rendered capable of selectively accumulating in the polymeric layer. All that needs to be done is to provide the dye with a photo-reactive group which, during polymerization, is capable of photo-chemically bonding to photo-polymerizable or photo-polymerized monomers. Since the dye is chemically bonded to the monomer, the risk of the photo-polymerization dye being released into the liquid layer during further use of the composite is also reduced. The dye is effectively encapsulated in the polymeric layer.

A convenient choice of photo-reactive dye is one wherein a photo-polymerization dye is functionalized with a photo-polymerizable group.

Therefore, in a preferred embodiment the photo-chemically reactive dye is a photo-polymerizable dye co-polymerizable with the photo-polymerizable monomer.

By selecting the photo-polymerizable dye to be co-polymerizable with the monomer, phase-separation of different polymeric components within the polymeric layer is avoided. Moreover, if the dye and the monomer are functionalized with the same photo-polymerizable group, the photo-reaction of the dye and the monomer the reaction rates and other relevant photo-reaction parameters are very similar resulting in a homogeneous and controlled photo-reaction.

In order to reduce the number of distinct components, in a particular embodiment of the composite in accordance with the invention, the photo-polymerizable dye and the photo-polymerizable monomer are one and the same monomer.

In order to shorten the time of photo-polymerization, it may be of advantage to reduce the absorbance of the stratified-phase-separable layer during photo-polymerization. To achieve this, in a preferred embodiment of the composite in accordance with the invention is characterized in that the photo-polymerization dye is a photo-bleachable dye.

Photo-bleachable dyes are known as such. In a particularly preferred embodiment the photo-polymerization dye is functionalized with a photo-polymerizable group and a photo-bleachable group. A photo-bleachable photo-polymerization dye is a dye of which the absorbance decreases as a function of photo-polymerization-inducing radiation dose received. A first class of photo-bleachable dye has a chromophore which is photo-cleavable, the photo-cleavage products absorbing not or at least to a smaller extent the radiation bringing about photo-polymerization. A second class is formed by the class of photo-chromic dyes which possess on the one hand a state which absorbs the radiation which brings about photo-polymerization and on the other hand a state which does not. Photo-chromic dyes are well known. Another class of photo-bleachable dyes is the class of photo-isomerizable dyes having a first isomer which does absorb radiation bringing about photo-polymerization and a second isomer which does not do so, the first isomer being convertible into the second upon subjecting the first isomer to radiation which brings about photo-polymerization. An example of such a dye is a dye functionalized with a group comprising an isomerizable double bond such as a stilbene group. Another class consists of photo-oxidizable photo-polymerization dyes.

In a further aspect, the invention relates to a stratified phase-separated composite in accordance with the invention wherein the stratified-phase-separable composition is a photo-crosslinkable stratified-phase-separable composition.

The use of composition which is photo-crosslinkable may improve phase-separation, in particular in the sense of reducing the number of liquid molecules present (present in dissolved and/or dispersed form) in the polymeric layer and/or improving the uniformity of the liquid layer-polymeric layer interface. Furthermore, in case the liquid layer is a liquid crystal layer, the use of photo-crosslinkable monomer may render the composite combinable with an extended range of alignment layers in order to achieve an oriented liquid crystal layer.

A photo-crosslinkable composition produces upon irradiation a crosslinked polymer. A crosslinked polymer, also referred to as a network polymer, has crosslinks which link polymer chains to each other to form a three-dimensional network. Examples of photo-crosslinkable compositions are well known in the art. A typical example of a photo-crosslinkable monomer composition comprises a monomer, which if photo-polymerized neat forms a linear polymer chain, and a photo-crosslinking agent. To provide the light intensity gradient required to bring about stratification, the photo-crosslinkable stratified-phase-separable composition comprises a photo-polymerization dye. Since the measure of rendering the composition photo-crosslinkable may be taken in conjunction with or separate from the provision of a selectively accumulating dye, the photo-polymerization dye may also be the liquid or a component of the liquid. Preferably however a photo-polymerization dye which selectively accumulates in the polymeric layer is used. Further advantages of cross-linked polymers is improved temperature and mechanical resistance and resistance to chemicals such as solvents which is convenient if the polymeric layer is to serve as a substrate for wet depositing further layers.

In another aspect, the invention seeks to enlarge the class of photo-polymerized phase-separated composites.

This objective is met by a stratified phase-separated composite comprising a photo-polymeric layer and a liquid layer, the composite being obtainable by photo-polymerizing a layer of a photo-polymerizable stratified-phase-separable composition, the composition comprising:

a photo-polymerizable monomer;
a photo-polymerization dye; and
a liquid,
wherein the photo-polymerizable monomer is an acrylate or a methacrylate monomer.

Photo-polymerizable (meth)acrylates are suitable monomers to obtain photo-polymerized phase-separated composites. By employing (meth)acrylates, phase-separated composites may be obtained which have excellent phase-separation, that is the number of liquid molecules present (present in dissolved and/or dispersed form) in the polymeric layer may be very low and/or the interface of the liquid layer and the polymeric layer is very uniform. In particular, the uniformity may be such that protrusions which extend from the polymeric layer across the entire thickness of the liquid layer are absent. The use of (meth)acrylate monomers is an independent aspect of the invention as (meth)acrylate monomers may be used in conjunction with or separate from the use of a photo-crosslinkable monomer and/or a photo-reactive photo-polymerization dye. Preferably, however, a photo-reactive (meth)acrylate dye and/or a photo-crosslinkable (meth)acrylate is used. In addition, the use of (meth)acrylates may widen the choice of alignment layers which may be combined with the composites in accordance with the invention.

Suitable other photo-polymerizable monomers and/or photo-polymerizable dyes include a monomer of a thiol-ene system, an epoxide, a vinylene, a vinylether, an oxetane or a cinnamate Particular suitable are photo-polymerizable monomers and/or dyes having one photo-polymerizable group which form main-chain and/or side-polymers, such as mono-(meth)acrylates, mono-epoxides, mono-vinylethers, mono-vinylenes, and dithiol thiol-ene systems. A cinnamate monomer which polymerizes via a step addition reaction requires two cinnamate groups to form a linear polymer chain. To obtain crosslinked polymers monomers comprising two or more photo-polymerizable groups, such as di(meth)acrylates, di-vinlyethers, di-oxetanes, di-vinylenes, di-epoxides, or thiol-ene systems comprising trithiol, a tri-ene, or di-enes provided with a mercapto group or ene-functionalized dithiols or higher homologues of such monomers, all of which are known in the art per se, may be used. Cross-linked cinnamates require monomers carrying at least three cinnamate groups. Particularly preferred are combinations of monomers having one photo-polymerizable group and monomers having two or more photo-polymerizable groups as they allow the degree of cross-linking to be freely selected.

The stratified-phase-separable material may comprise just one type of monomer to produce a homopolymer but generally it will contain more than one type to obtain copolymers, terpolymers or higher. The monomer may itself be a polymer also referred to as a prepolymer which is further polymerized. Different non-co-polymerizable monomers may also be used to obtain a polymer blend which may or may not be phase-separated.

Combinations of liquid crystal and monomers which may be suitable candidates for use in the stratified-phase-separable compositions in accordance with the invention are those used to manufacture polymer dispersed liquid crystals.

The photo-polymerization to be performed in order to obtain the stratified-phase-separated composite is as such conventional. It is not essential, yet convenient to include a photo-initiator in the stratified-phase-separable material to initiate the photo-polymerization. Conventional photo-initiators are suitable for this purpose. The photo-polymerization is performed using actinic radiation such as e-beam or ion beam radiation or electromagnetic radiation such x-ray or gamma-ray radiation. Generally, it is preferable to use less energetic radiation which is still sufficiently energetic to break or form covalent bonds, such as UV and visible light. Since many optical devices, such as displays, are to be active in the visible range of the spectrum radiation UV radiation is preferred, in particular UV light above 300 nm as glass becomes absorbing below 300 nm. The photo-polymerization may be performed as a flood exposure or in accordance with a desired pattern, for example using a mask or a combination thereof.

There is no limit on the type of liquid which may be used for the composite in accordance with the invention other than it should be able to form a liquid layer by means of stratified phase-separation. Examples include inorganic liquids such as water or water-based liquids and organic liquids such as solvents. The liquid may in particular be an electro-optical liquid, such as a liquid for use in an electrophoretic display or a liquid crystal display.

In a particularly suitable embodiment, the liquid is a liquid crystal.

Suitable liquid crystals include those capable of forming a planar, a homeotropic, a twisted or splay orientation. The orientation can also be uniaxial or biaxial. Any LC phase may be suitably used, such as nematic, twisted nematic, cholesteric, discotic, smectic A and C, ferroelectric, flexo-electric and the like. The liquid crystal layer may be partitioned into a number of distinct domains, each domain having a different anisotropic orientation such as a sub-pixel domain. In particular, the difference in orientation may be limited to a difference in the orientation of the director(s) while the type of anisotropy is the same.

The liquid may also be a polymerizable or polymerized liquid. The latter, being a solid, is of particular advantage in applications where the fluid nature of the liquid is of no relevance for the function to be achieved.

The thickness of the liquid layer will depend on the particular application sought but generally will vary from 0.1 $\mu$m to 1 mm. In case the liquid layer is a liquid crystal layer the thickness will typically be 0.5 $\mu$m to 10 $\mu$m or more particular, 1 $\mu$m to 5 $\mu$m. The thickness of the polymeric layer will depend on its function in the composite. If the polymeric layer as such does not have to provide the necessary protection and/or ruggedness, resistance to tear and other mechanical forces, but has to be capable of providing a substrate surface for the provision of subsequent layers such as layers which do provide the necessary ruggedness and/or mechanical integrity the polymeric layer can be relatively thin, typically 0.1 to 5 $\mu$m. On the other hand, if the polymeric layer is to provide a significant contribution to the mechanical integrity of the composite, a thicker polymeric layer is preferably, typically larger than 5 $\mu$m. Since the time required to phase-separate increases as the combined thickness of liquid layer and polymeric layer increases it is generally desirable to keep the combined thickness as low as possible. Typically, the combined thickness would be less than 100 $\mu$m or more particular less than 50 $\mu$m.

The specific relative amounts of liquid and photo-polymerizable monomer in a stratified-phase-separable composition in accordance with the invention will depend on the desired ratio of liquid to polymeric layer thickness but generally will be between 1 and 99 percent by weight. Phase-separation is more easily facilitated if the relative amount of liquid or monomer ranges between 5 and 90 wt % or better between 10 and 80 wt %. The relative amount photo-polymerization dye, if added as a separate component, is determined by the desired light intensity gradient. Typically, the amount will be less than 20 wt % or even less than 10 wt % of the total weight of the stratified-phase-separable material.

To confine the liquid layer during use of the composite and/or to provide a surface on which a layer phase-separable material may be provided, a substrate may be used. Suitable substrates include glass and plastic but also metal mirror coated or silicon substrates optionally comprising integrated circuits manufactured using CMOS technology. If the composite is used for a transmissive optical application the single substrate is to be transparent. The composite in accordance with the invention may in particular combined with a flexible substrate, such as a foldable. In order to facilitate roll to roll manufacturing of the composite a wrappable substrate may be used. Suitable materials for flexible, foldable and/or wrappable single substrates include polymer films and sheets, metal foils and coated paper or laminates thereof.

In case the liquid layer is a liquid crystal layer which is to be anisotropically oriented it is convenient—as is well known in the art—to provide the substrate with an alignment layer. In particular, composite in accordance with the invention may be combined with not only a polyvinylalcohol alignment layer but also with a polyimide layer.

Combining a composite in accordance with the invention with a substrate during use and/or manufacture at least confines the liquid in directions normal to the liquid layer. In order to prevent liquid from leaking away from the composite may be packaged. Alternatively, by providing the substrate with a recess or with ridges an enclosure adapted to contain phase-separable material may be formed. After phase-separation, the polymeric layer caps the enclosure and its perimeter is attached to the side-walls of the enclosure thus obtaining a liquid tight container. The enclosure may be formed in any convenient manner for example, in the case of a plastic substrate, by injection molding. In a particular embodiment, ridges forming an enclosure may be obtained from the photo-polymerizable phase-separable material by pattern-wise photo-polymerization, eg by means of a mask having a pattern outlining the ridges to be formed.

In order to improve the mechanical integrity and stability of the stratified-phase-separated composite and/or maintain a well-defined liquid crystal layer thickness, the liquid crystal layer may comprise and/or may be partitioned by connecting (supporting) members which connect the substrate to the polymeric layer. Thus, the thickness of the connecting members exceeds the thickness of the liquid crystal layer. The connecting members may be conventional spacers which are partially embedded in the cover layer, or a relief structure pattern photo-lithographically provided on the substrate before the stratified-phase-separated composite is formed using for example a photo-resist. In a very advantageous embodiment, the connecting members are formed from pattern-wise photo-polymerizing the photo-polymerizable stratified-phase-separable coating material, eg by means of a mask. The pattern-wise photo-polymerization is conveniently performed before or simultaneous to the flood-exposure required to form the phase-separated polymeric and liquid layer.

The composite in accordance with the invention may be used for a variety of applications. In its broadest sense it may be used for any application involving a liquid. A general application if combined with a substrate is a liquid-tight packaged liquid for containing thin (0.1 $\mu$m to 1 mm) films of liquid of large surface area (1 cm$^2$ to m$^2$). The composites in accordance with the invention allow such liquid-filled packages to be formed quickly and in an easy manner. Filling large area thin containers with liquid in the traditional manner is cumbersome. If the liquid is selected to be polymerizable, the composite in accordance with the invention may also be used for solid-state applications.

An important class of applications involves are optical and electro-optical applications in particular when the liquid is liquid crystal. In particular if the photo-polymerization is performed pattern-wise microlens arrays, gratings and structures can be manufactured.

In a preferred embodiment, the invention relates to an optical, electro-optical or display device comprising a composite in accordance with the invention The composite in accordance with the invention may comprise liquid crystal which is switchable between a first and second state, the first and second state having different optical properties such as a difference in polarization selectivity. Thus, the composite in accordance with the invention may be used in an LC display device. In principle, there is no limitation on the LC effect and device. However in a preferred embodiment an in-plane switching arrangement is used. As the composites may be manufactured in a continuous process rather than a batch process they are of particular advantage in roll-to-roll manufactured displays.

The invention also relates to a method of manufacturing a stratified-phase-separated composite in accordance with the invention. In a first embodiment, the method comprises:
providing a supporting substrate;
applying, on the substrate, a layer of photo-polymerizable stratified-phase-separable composition comprising:
a photo-polymerizable monomer;
a photo-polymerization dye; and
a liquid;
photo-polymerizing the layer of photo-polymerizable stratified-phase-separable composition to cause phase-separation into the stratified phase-separated composite comprising the liquid layer and the photo-polymeric layer.

In a broad sense, the method of this embodiment, which may also be referred as a single substrate method, provides an alternative method of forming a packaged liquid layer. The method is of particular use in case the liquid layer to be packaged is thin, say about 0.1 $\mu$m to 1 mm, is of large surface area, typically form about 0.1 cm$^2$ to about 1 m$^2$ or more and/or has to have a uniform well-defined thickness to be kept constant during use of the packaged liquid layer. Packaging thin and large area liquid layers by filling a thin and large area container with liquid is cumbersome. The method in accordance with this embodiment is commensurate with a bottom-up process in which layers are stacked on top of the other. The method may in particular be combined with the provision of further layers by wet deposition methods such as coating and printing methods. The method may be performed in a batch process but also in a continuous process, in particular the method may be used in a roll-to-roll manufacturing process thus allowing cost-effective mass-production.

In a preferred embodiment of the single substrate method, the photo-polymerization dye selectively accumulates in the polymeric layer being formed and/or the photo-polymerizable monomer is photo-crosslinkable and/or the monomer is a (meth)acrylate.

A plurality of single substrate composites obtainable from the single method may be stacked to form a stack of single substrate stratified-phase-separated composites. Such a stack of composites may, for example, be used to obtain a multi or even full color display in which the active LC layers are stacked one on top the other to gain a factor of three in active display area. By using a single substrate to form a stacked display instead of a double substrate the distance between the active layers can be reduced to twice the thickness of the polymeric layer which may as low as 5 to 10 μm. In this way parallax effects prominent in conventional stacked displays are significantly reduced.

In one embodiment, the single substrate method is repeated a number of times in succession where the single substrate stack of a previous time is used as the single substrate for a next single substrate step. Alternatively, two single substrate composites may be prepared separately and then attached to each via their polymeric layers. In this embodiment, the electrodes may be provided on both single substrates to form a single sandwich electrode arrangement or each substrate may be provided with in-plane switching electrodes to render both liquid layers (independently) switchable.

Another embodiment of the method in accordance with the invention comprises:

providing a cell adapted to contain a layer of a photo-polymerizable stratified-phase-separable composition;

filling the cell with photo-polymerizable stratified-phase-separable composition to form a layer of photo-reactive stratified-phase-separable material, the stratified-phase-separable composition comprising:
a photo-polymerizable monomer;
a photo-polymerization dye; and a liquid;

photo-polymerizing the layer of photo-polymerizable stratified-phase-separable composition to cause phase-separation into the stratified phase-separated composite comprising the liquid layer and the photo-polymeric layer.

This method, also referred to as the double substrate method, may be useful for example when very thin polymer layers are to be manufactured. Such thin polymeric layer may be desirable if the composite forms part of an LC cell in which the liquid layer of the composite is the active LC layer. In case the LC layer is to be rendered switchable by sandwiching the composite between two opposed substrates each provided with electrodes, the polymeric layer is preferably thin to reduce capacitance.

In a preferred embodiment of the double substrate method, the photo-polymerization dye selectively accumulates in the polymeric layer being formed and/or the photo-polymerizable monomer is photo-crosslinkable and/or the monomer is a (meth)acrylate.

The invention also relates to stratified-phase-separable compositions. In accordance with the invention, the composition comprises:
a photo-polymerizable monomer;
a photo-polymerization dye which, during photo-polymerization, selectively accumulates in a photo-polymeric layer being formed; and
a liquid.

In a related aspect of the invention, the composition comprises:
a photo-polymerizable monomer;
a photo-polymerization dye; and
a liquid,
wherein the photo-polymerizable monomer is an acrylate or a methacrylate monomer.

The effects and advantages associated with the compositions in accordance with the invention preferred embodiments and properties of such composites have been described hereinabove.

These and other aspects of the invention will be apparent from and elucidated with reference to the examples described hereinafter.

EXAMPLE 1

A stratified-phase-separated composite is manufactured using a method in accordance with the invention as follows:

A stratified-phase-separable composition is provided having the following composition:

50 wt % liquid crystal E7,
44.5 wt % photo-polymerizable isobornylmethacrylate (formula A1),
0.5 wt % photo-initiator (formula A2), and
5.0 wt % photo-polymerizable stilbene dye (formula A3).

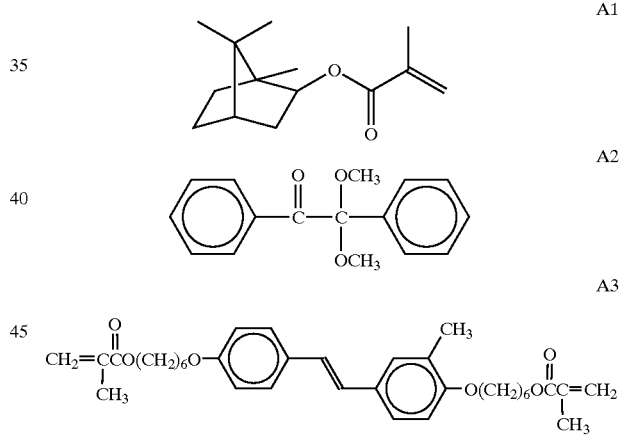

Liquid crystal E7 is marketed by Merck and comprises a mixture of cyanobiphenyls and a cyanoterphenyls. The photo-initiator A2 is marketed under the trade name Irgacure 651 by Ciba Geigy. The light-absorbing stilbene monomer A3 is synthesized using the method described in copending U.S. patent application publication 20030038912A1, filed 9 Aug. 2002 for Dirk Jan Broer and Roel Penterman, published 17 Feb. 2003, and incorporated by reference herein.

Figure 2:
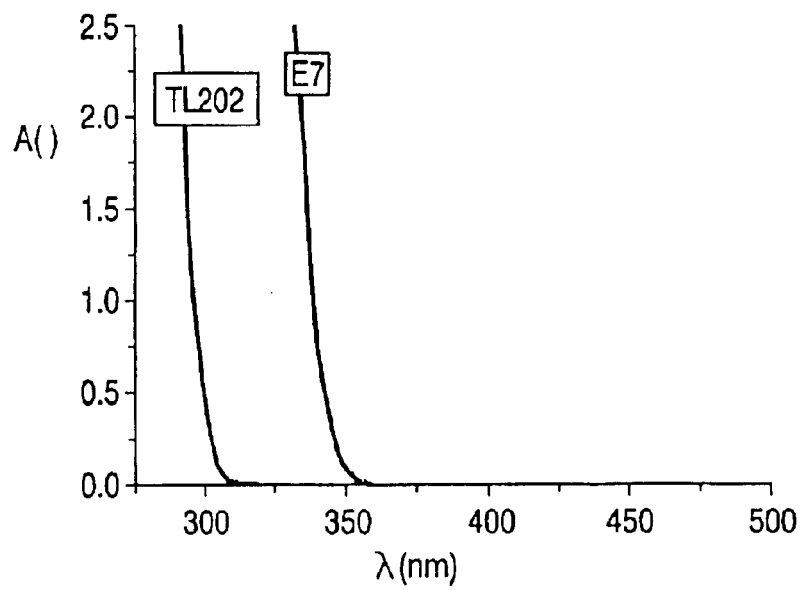
FIG. 2 shows a graph of the absorption spectrum, plotted as absorbance A (in dimensionless units) as a function of wavelength λ (in nm), of different liquid crystals.
Figure 3:
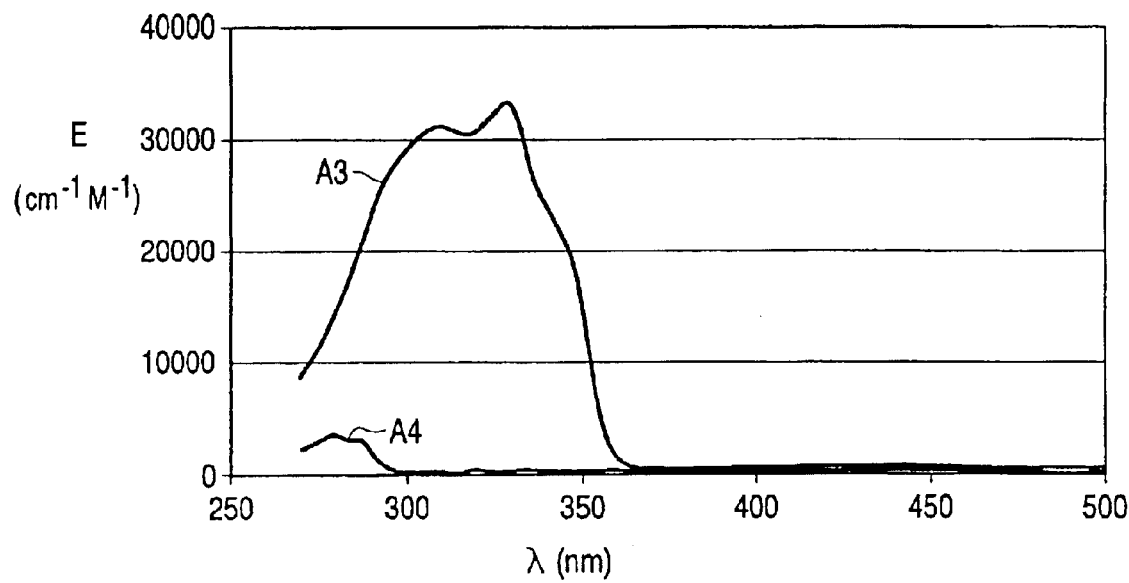
FIG. 3 shows the absorption spectrum, plotted as extinction E (in $cm^{-1}M^{-1}$) as a function of wavelength λ (in nm) of different photo-polymerizable monomers.

Referring to FIG. 2 the curve labeled E7 and FIG. 3, the curve labeled A3, the liquid crystal E7 and dye A3 have a significant absorption in the range of 300 to 350 nm. The photo-initiator used to initiate the photo-polymerization also absorbs in this wavelength range, so the liquid crystal E7 and dye A3 are photo-polymerization dyes. Being functionalized with a methacrylate group the dye A3 is a photochemically reactive dye. Since the photo-polymerizable monomer A1 is also functionalized with a methacrylate group the dye A3 is also photo-polymerizable and moreover capable of being co-polymerized with the monomer A1. In particular, the dye A3 has two methacrylate groups which renders the dye A3 a photo-crosslinkable monomer. More in particular, the dye A3 is a photo-isomerizable dye as the stilbene moiety can be photo-chemically converted from the trans to cis isomer and back. The absorption spectrum of the cis and the trans isomer are different. At selected wavelengths the trans isomer absorbs stronger than the cis isomer. At those selected wavelengths the A3 dye if present in the trans isomer is photo-bleachable.

Figure 1A:
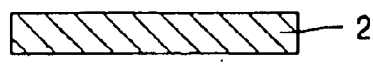
FIGS. 1A–1C show, schematically, in a cross-sectional view, stages of the manufacture of an embodiment of a stratified-phase-separated composite in accordance with the invention.
Figure 1B:
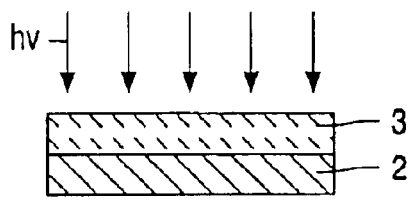

Referring to FIG. 1A, a supporting glass substrate 2 having a thickness of about 1.1 mm is provided. There is no particular reason for the substrate to have this thickness. Thinner conventional substrates of glass or plastic with a thickness down to 0.4 mm may also be used. The substrate 2 is then provided with a rubbed polyimide (AL1051, JSR) alignment layer for orienting the liquid crystal E7. The thickness of the alignment layer is estimated to be about 100 to 200 nm. Referring to FIG. 1B, a 10 $\mu$m film 3 of the said stratified-phase-separable composition is coated on the glass substrate 2 using a blade coating apparatus at room temperature. The film 3 thus formed is then exposed to UV light (lamp type: Philips TL-08, 0.5 mW/cm$^2$ equipped with a 320–350 nm band-pass filter) for 15 minutes at a temperature of 60° C.

Figure 1C:
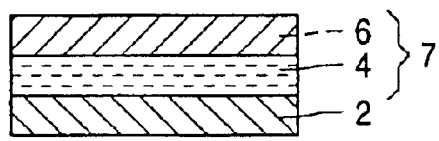

Upon exposure to UV light, due to absorption by the monomer A3 and liquid crystal E7, a light intensity gradient is set up in the direction normal to the substrate 2. The light intensity being highest near the top of the film 3, polymerization selectively occurs in the near the film/air interface. The polymer formed by the UV exposure is not miscible with the liquid crystal material E7 and thus phase separates from the liquid crystal material. Under the influence of the light intensity gradient set up by the blanket exposure, the phase separation proceeds in the form of a stratification process in which a separate polymer layer is formed on top of the liquid crystal layer of E7, wherein the liquid crystal layer is formed on the substrate side of the polymeric layer. Monomeric material A1 is selectively depleted at the top of the film 3, more in particular at the interface of the liquid crystal layer and polymer layer being formed, as a result of which a diffusion gradient in monomer A1 (and A3) concentration is set up as a result of which monomer material A1 (and A3) is continuously fed to the liquid crystal layer/polymer layer interface which allows the stratification process to proceed further finally resulting in a stratified-phase-separated composite 7 comprising an about 5 $\mu$m thick polymeric layer 6 of polymerized A1 and A3 monomers and an about 5 $\mu$m thick liquid crystal layer 4 of E7, as shown in FIG. 1C.

Of a stratified-phase-separated composite in accordance with the invention thus manufactured, the liquid crystal material is recovered from the stratified phase-separated composite 7 and its transition temperature is measured. The measured transition temperature is the same as that of fresh liquid crystal material E7, which demonstrates that the liquid crystal layer 4 of the stratified phase-separated composite 7 essentially consists of liquid crystal material E7. In particular, it demonstrates that the photo-polymerization dye A3 is selectively accumulated in the polymeric layer 6.

The liquid crystal layer is an electro-optical layer as its reflection/transmission characteristics can be reversibly switched by subjecting the composite to an external electrical field, the electro-optical effect rendered visible by placing the stratified phase-separated composite layer between crossed first and second polarizers.

If the stratified-phase-separated composite is aligned such that the rubbing direction of the polyimide layer makes an angle of 45° with the polar axis of each of the two polars, the laminate has a maximal transmission indicating that the liquid crystal layer LC molecules have a more or less uniaxial alignment. With the laminate sandwiched between electrodes and a suitable voltage applied, the display laminate turns dark indicating that LC molecules adopt a homeotropic alignment in which case the light polarized by the first polarizer incident on the LC layer does not experience birefringence as a consequence of which the polarization direction of the incident light is not changed and hence absorbed by the second polarizer. After removal of the voltage the cell turns bright again. This process can be repeated over and over again. This example inter alia demonstrates that stratified-phase-separated composites may be obtained using a method which involves the use of a single substrate. It also demonstrates that stratified-phase-separated composites may be formed using (meth)acrylates.

EXAMPLE 2

Example 1 is repeated with the difference that in the stratified-phase-separable composition the liquid crystal E7 is replaced by the liquid crystal TL202. The liquid crystal TL202 is commercially available from Merck and is a mixture containing halogenated biphenyl and terphenyl compounds.

Referring to the curve labeled TL202 in FIG. 2, the liquid crystal TL202 does not absorb in the range of wavelengths used to perform the photo-polymerization which is 320 nm to 350 nm (see Example 1).

The stratified-phase-separated composite obtained using the method given in Example 1 contains a TL202 liquid crystal layer. The TL202 liquid crystal is uniaxially aligned and is electro-optically active.

This example demonstrates that, in accordance with the invention, the range of liquids which may be suitable used to form a stratified-phase-separated composite, a method of obtaining such a composite and a stratified-phase-separable composition is extended. In particular, the example demonstrates that the stratified-phase-separated composite may be combined with non-absorbing liquid crystals. Furthermore, it demonstrates that stratified-phase-separated composites may be manufactured from compositions which contain a photo-polymerization dye as a component separate from the liquid crystal and thus allow a wider range of composites to be prepared.

EXAMPLE 3

Figure 4:
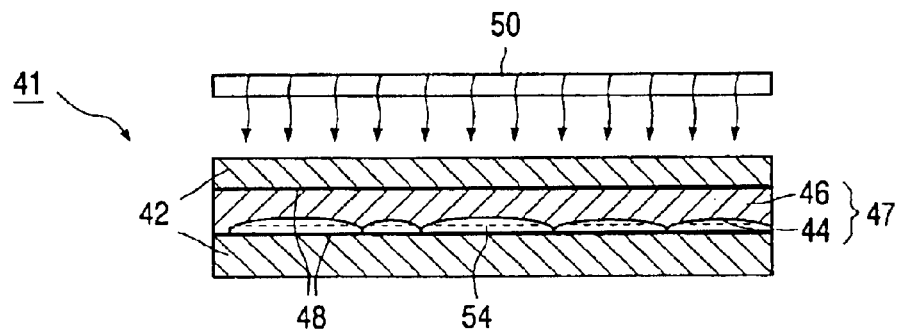
FIG. 4 shows, schematically, in a cross-sectional view, a cell comprising a stratified phase-separated composite in accordance with the invention.

FIG. 4 shows, schematically, in a cross-sectional view, a cell comprising a stratified phase-separated composite in accordance with the invention.

A transparent cell 41, also referred to as a double substrate cell, is made by positioning two glass substrates 42 each carrying a rubbed polyimide alignment layer 48 (AL1051 of JSR) opposite one another at a distance of 8 $\mu$m by means of spacers and subsequently gluing the substrates together along the perimeter leaving a small opening for filling. The cell thus made is filled, at 50° C., by capillary action with a quantity of the stratified-phase-separable composition of Example 2. The filled cell is exposed to UV-light (Philips TL-08, 0.1 mW/cm2 equipped with a 320–350 nm band-pass filter) for 30 minutes at a temperature of 50° C. and then cooled down to room temperature. During exposure, an intensity gradient for wavelengths of 300–350 nm is established due to the absorption of the composition in that wavelength range.

After the exposure a stratified-phase-separated composite 47 is formed between the two glass substrates 42. Consistent with the intensity gradient formed, the polymeric layer 46 is formed closest and the liquid layer 44 is formed furthest away from the UV light source 50.

The cell 41 containing the stratified-phase-separated composite 47 is then examined using a polarization microscope by positioning the cell between crossed polarizers. When a polarizer is aligned with the rubbing direction of the alignment layer which is in direct with the liquid layer, the cell appears dark. When the cell is turned to make an angle of 45° with the polarizers the entire cell appears bright thus demonstrating that the liquid crystal layer has the same uniaxial orientation throughout the liquid crystal layer.

This example demonstrates that also in a double substrate cell, in accordance with the invention, the range of liquids which may be suitable used to form a stratified-phase-separated composite, a method of obtaining such a composite and a stratified-phase-separable composition is extended in particular liquids which are non-absorbing with respect to the radiation used to photo-polymerize.

Comparative Example 1

A cell 51 containing a phase-separated composite is manufactured in accordance with Example 3 with the difference that the photo-polymerizable dye A3 is replaced with the photo-polymerizable monomer A4.

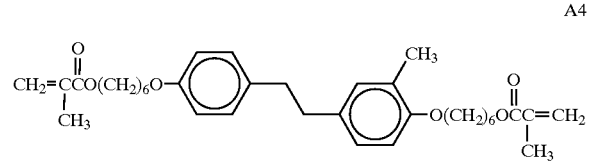

The dye A4, 4,4'-di-(6-methacryloyloxyhexyloxy)-3-methylbibenzyl in the scheme below referred to as 4, is synthesized as follows:

A: 4,4'-di-(6-hydroxyhexyloxy)-3-methylbibenzyl (5)

A mixture of 2.1 g (5.0 mmol) of (E)-4,4'-di-(6-hydroxyhexyloxy)-3-methylstilbene (3), synthesized in accordance with the method described in the European patent application having application number 01204081.2 filed by Applicant (Applicant's reference PHNL010757), 0.25 g of $Pd(OH)_2$ on carbon, 35 ml of cyclohexene and 50 ml of ethanol is refluxed for one night. The hot solution is passed through Celite and added dropwise to 400 ml of water. The precipitated product is washed with water. 1.8 g of the product (86%) was obtained after drying.

B: 4,4'-di-(6-methacryloyloxyhexyloxy)-3-methylbibenzyl (4) (also referred to as A4)

0.5 ml (5.1 mmol) of methacryloyl chloride is added to a mixture of 1.0 g (2.3 mmol) of 4,4'-di-(6-hydroxyhexyloxy)-3-methylbibenzyl (5), 1.5 ml (10.3 mmol) of triethylamine and 20 ml of dichloromethane stirred at 0° C. Stirring is continued for one night at room temperature. The resulting dichloromethane solution is extracted twice with 40 ml of 2.4N HCl and once with saturated brine. After drying using magnesium sulphate the solution was evaporated. 0.5 g of the product A4 (38%) was obtained as an oil after fractionation by column chromatography (silica/dichloromethane).

As evidenced from the curve labeled A4 in FIG. 3, the photo-polymerizable monomer A4 does not absorb in the wavelength range from 300 to 350 nm and as such the monomer A4 is not a photo-polymerization dye. Indeed, as none of the other components absorb light in the range of 300 to 350 nm the stratified-phase-separable composition of this example does not contain a photo-polymerization dye and, accordingly, the composition of this example is not in accordance with the invention.

Figure 6:
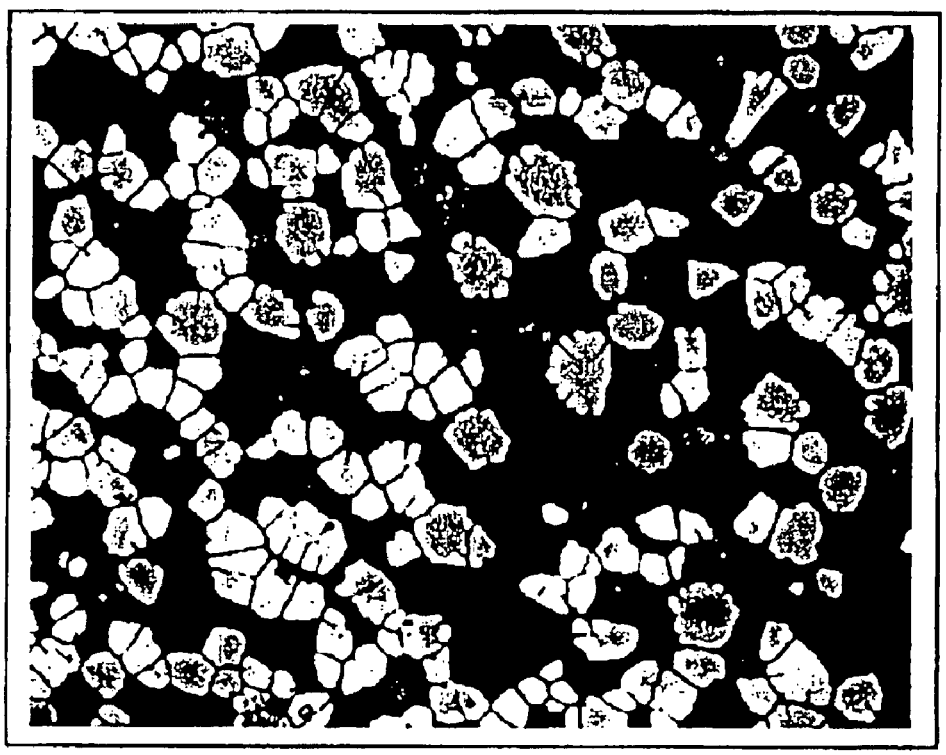
FIG. 6 shows a polarization-microscopic photograph of the composite shown in FIG. 5.

Referring to FIG. 6, the phase-separated composite thus manufactured has a continuous polymeric layer 56. Directly adjacent to both of the substrates 42 and on both sides of the

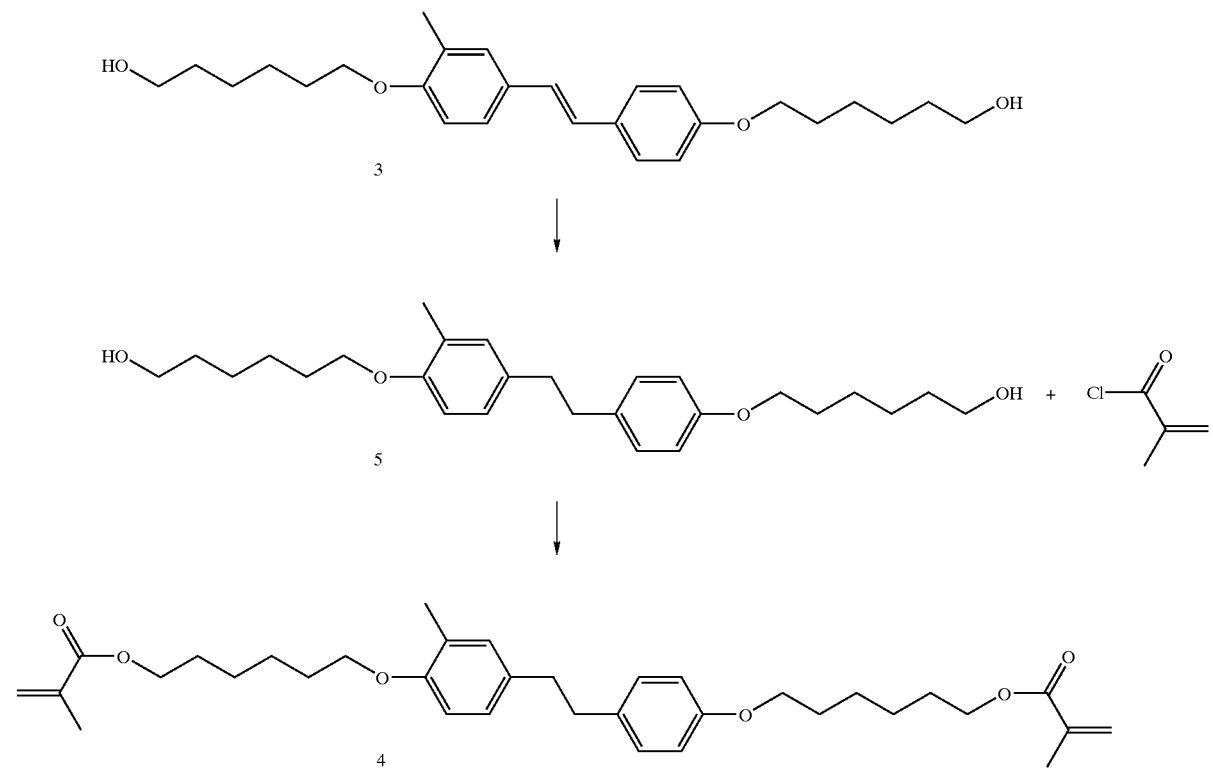

polymeric layer 56, liquid crystal domains 54 are randomly formed. The liquid crystal domains are typically 50 μm large and do not form a continuous layer. The composite is therefore not a stratified-phase-separated composite in accordance with the invention. The presence of the LC domains 54 can be made visible by removing one of the substrates 42, washing away the LC material thus exposed and examining the cell so dismantled under a polarization microscope. When the rubbing direction of the alignment layers 48 is set at an 45° angle with respect to the polar axes of the polarizers of the microscope a random pattern of bright areas appears.

Figure 5:
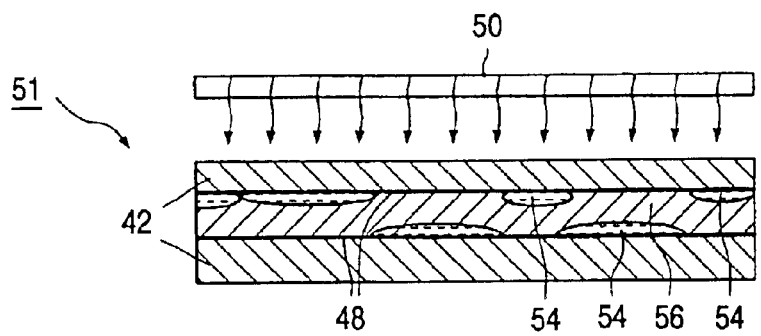
FIG. 5 shows, schematically, in a cross-sectional view, a cell comprising a phase-separated composite not in accordance with the invention.

FIG. 6 shows a polarization-microscopic photograph of this situation. The bright areas correspond to LC domains with are uniaxially in the direction of rubbing. in the dark areas no liquid crystal confirming what is shown schematically in cross-section in FIG. 5.

Comparative example 1, in conjunction with Example 3, demonstrates that a photo-polymerization dye, in particular a photo-polymerization dye which selectively accumulates in the polymeric layer, is essential to obtain a phase-separated composite which is stratified to form a polymeric and a liquid layer.

What is claimed is:

1. A stratified phase-separated composite comprising a photo-polymeric layer and a liquid layer, the composite being obtained by photo-polymerizing a layer of a photo-polymerizable stratified-phase-separable composition, the composition comprising:
   a photo-polymerizable monomer;
   a photo-polymerization dye which, during photo-polymerization, selectively accumulates in the photo-polymeric layer being formed; and
   a liquid.

2. A stratified phase-separated composite as claimed in claim 1, wherein the photo-polymerization dye is a photo-chemically reactive dye which, during photo-polymerization, is photo-chemically bonded to the photo-polymerizable monomer.

3. A stratified phase-separated composite as claimed in claim 2, wherein the photo-polymerization dye is a photo-bleachable dye.

4. A stratified phase-separated composite as claimed in claim 3, wherein the stratified-phase-separable composition is a photo-crosslinkable stratified-phase-separable composition.

5. A stratified phase-separated composite as claimed in claim 2, wherein the stratified-phase-separable composition is a photo-crosslinkable stratified-phase-separable composition.

6. A stratified phase-separated composite as claimed in claim 2, wherein the liquid is a liquid crystal.

7. A composite as claimed in claim 2, wherein the photo-polymerization dye is a photo-polymerizable dye that is co-polymerized with the photo-polymerizable monomer.

8. A stratified phase-separated composite as claimed in claim 7, wherein the photo-polymerization dye is a photo-bleachable dye.

9. A stratified phase-separated composite as claimed in claim 7, wherein the stratified-phase-separable composition is a photo-crosslinkable stratified-phase-separable composition.

10. A stratified phase-separated composite as claimed in claim 7, wherein the liquid is a liquid crystal.

11. A composite as claimed in claim 7, wherein the photo-polymerization dye and the photo-polymerizable monomer are one and the same monomer.

12. A composite as claimed in claim 1, wherein the photo-polymerization dye is a photo-bleachable dye.

13. A stratified phase-separated composite as claimed in claim 1 wherein the stratified-phase-separable composition is a photo-crosslinkable stratified-phase-separable composition.

14. A composite as claimed in claim 1, wherein the liquid is a liquid crystal.

15. A display device comprising a composite as claimed in claim 1.

16. A stratified phase-separated composite comprising
   a photo-polymeric layer and
   a liquid layer,
   the composite being obtained by photo-polymerizing a layer of a photo-polymerizable stratified-phase-separable composition,
   the composition comprising:
      a photo-polymerizable monomer;
      a photo-polymerization dye which, during photo-polymerization, selectively accumulates in the photo-polymeric layer being formed; and
      a liquid,
   wherein the photo-polymerizable monomer is an acrylate or a methacrylate monomer.

17. A method of manufacturing a stratified phase-separated composite comprising a photo-polymeric layer and a liquid layer, the method comprising:
   providing a supporting substrate;
   applying, on the substrate, a layer of photo-polymerizable stratified-phase-separable composition comprising:
      a photo-polymerizable monomer;
      a photo-polymerization dye which, during photo-polymerization, selectively accumulates in the photo-polymeric layer; and
      a liquid;
   photo-polymerizing the layer of photo-polymerizable stratified-phase-separable composition to cause phase-separation into the stratified phase-separated composite comprising the liquid layer and the photo-polymeric layer.

18. A method of manufacturing a stratified phase-separated composite comprising a photo-polymeric layer and a liquid layer, the method comprising:
   providing a cell adapted to contain a layer of a photo-polymerizable stratified-phase-separable composition;
   filling the cell with photo-polymerizable stratified-phase-separable composition to form a layer of photo-reactive stratified-phase-separable material, the stratified-phase-separable composition comprising:
      a photo-polymerizable monomer;
      a photo-polymerization dye which, during photo-polymerization, selectively accumulates in the photo-polymeric layer; and
      a liquid;
   photo-polymerizing the layer of photo-polymerizable stratified-phase-separable composition to cause phase-separation into the stratified phase-separated composite comprising the liquid layer and the photo-polymeric layer.

19. A stratified-phase-separable composition comprising:
   a photo-polymerizable monomer;
   a photo-polymerization dye which, during photo-polymerization, selectively accumulates in a photo-polymeric layer being formed; and
   a liquid.

20. A stratified-phase-separable composition comprising:
   a photo-polymerizable monomer;
   a photo-polymerization dye which, during photo-polymerization, selectively accumulates in a photo-polymeric layer being formed; and
   a liquid,
   wherein the photo-polymerizable monomer is an acrylate or a methacrylate monomer.

* * * * *